United States Patent
Lee et al.

(10) Patent No.: US 10,499,230 B2
(45) Date of Patent: Dec. 3, 2019

(54) METHOD AND APPARATUS FOR CHANGING, BY TERMINAL, PRIORITY IN MCPTT

(71) Applicant: LG ELECTRONICS INC., Seoul (KR)

(72) Inventors: Jaewook Lee, Seoul (KR); Sunghoon Jung, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/562,723

(22) PCT Filed: Mar. 23, 2016

(86) PCT No.: PCT/KR2016/002912
§ 371 (c)(1),
(2) Date: Sep. 28, 2017

(87) PCT Pub. No.: WO2016/159559
PCT Pub. Date: Oct. 6, 2016

(65) Prior Publication Data
US 2018/0077552 A1  Mar. 15, 2018

Related U.S. Application Data

(60) Provisional application No. 62/142,488, filed on Apr. 3, 2015, provisional application No. 62/149,649, filed on Apr. 19, 2015.

(51) Int. Cl.
*H04W 4/90* (2018.01)
*H04W 4/10* (2009.01)
(Continued)

(52) U.S. Cl.
CPC ............... *H04W 4/90* (2018.02); *H04W 4/08* (2013.01); *H04W 4/10* (2013.01); *H04W 72/10* (2013.01);
(Continued)

(58) Field of Classification Search
CPC ........ H04W 76/14; H04W 4/10; H04W 72/10
See application file for complete search history.

(56) References Cited

U.S. PATENT DOCUMENTS

2012/0094627 A1* 4/2012 Suh .................. H04W 4/22
455/404.1
2014/0328329 A1* 11/2014 Novlan ............... H04W 72/042
370/336

(Continued)

FOREIGN PATENT DOCUMENTS

WO      2015020375      2/2015

OTHER PUBLICATIONS

3GPP TS 22.179 v13.1.0, "3GPP: TSGSSA; Mission Critical Push to Talk (MCPTT) over LTE, Stage 1 (Release 13)," Mar. 21, 2015, see pp. 11-68.

(Continued)

*Primary Examiner* — Dung Hong
(74) *Attorney, Agent, or Firm* — Dentons US LLP

(57) ABSTRACT

Provided are a method for changing, by a terminal, priority in a wireless communication system, and an apparatus for supporting the same. The terminal may change priority for a D2D communication and transmit the changed priority to a terminal of a group to which the terminal belongs.

13 Claims, 18 Drawing Sheets

(51) Int. Cl.
*H04W 72/12* (2009.01)
*H04W 76/00* (2018.01)
*H04W 76/14* (2018.01)
*H04W 72/10* (2009.01)
*H04W 4/08* (2009.01)
*H04W 92/18* (2009.01)

(52) U.S. Cl.
CPC ........... *H04W 72/12* (2013.01); *H04W 76/00* (2013.01); *H04W 76/14* (2018.02); *H04W 92/18* (2013.01)

(56) References Cited

U.S. PATENT DOCUMENTS

| | | | |
|---|---|---|---|
| 2015/0029866 | A1 | 1/2015 | Liao et al. |
| 2016/0344726 | A1* | 11/2016 | Stojanovski .......... H04W 76/10 |
| 2016/0374105 | A1* | 12/2016 | Kalhan ............. H04W 72/1278 |
| 2017/0230939 | A1* | 8/2017 | Rudolf .................. H04W 72/04 |
| 2017/0273124 | A1* | 9/2017 | Yang ..................... H04W 88/02 |
| 2017/0303100 | A1* | 10/2017 | Dong ....................... H04W 4/10 |
| 2017/0303102 | A1* | 10/2017 | Dong ....................... H04W 4/10 |
| 2018/0213521 | A1* | 7/2018 | Martin ................ H04W 72/048 |

OTHER PUBLICATIONS

Intel, "Way Forward on ProSe Group Priority," S2-144282, 3GPP TSG SA WG2 Meeting #106, San Francisco, California, USA, Nov. 11, 2014, see pp. 1 & 2.

\* cited by examiner

METHOD AND APPARATUS FOR CHANGING, BY TERMINAL, PRIORITY IN MCPTT

CROSS-REFERENCE TO RELATED APPLICATIONS

This application is the National Stage filing under 35 U.S.C. 371 of International Application No. PCT/KR2016/002912, filed on Mar. 23, 2016, which claims the benefit of U.S. Provisional Applications No. 62/142,488 filed on Apr. 3, 2015, and No. 62/149,649 filed on Apr. 19, 2015, the contents of which are all hereby incorporated by reference herein in their entirety.

BACKGROUND OF THE INVENTION

Field of the Invention

The present invention relates to a wireless communication system, and more particularly, to a method for changing, by a UE, priority in a wireless communication system, and an apparatus for supporting the same.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

In recent years, there is growing interest in a Device-to-Device (D2D) technology performing direct communication between devices. In particular, the D2D is attracting attention as a communication technology for a public safety network. A commercial communication network has been rapidly changed to the LTE but a current public safety network is based on a 2G technology in a collision problem and a cost side with an existing communication standard. Request for the technology clearance and an improved service induces an effort to improve the public safety network.

The public safety network has high service requirements (reliability and security) as compared with a commercial communication network. In particular, when coverage of cellular communication is insufficient or is not used, there is a need for direct signal transmission/reception between devices, that is, a D2D operation.

The D2D operation may be signal transmission/reception between adjacent devices to have various advantages. For example, a D2D UE may perform data communication with a high transmission rate and low delay. Further, the D2D operation may distribute traffic converged in a base station. If the D2D UE serves as a relay, the D2D UE may serve to extend coverage of a base station.

The 3GPP has created a working group exclusively responsible for Public Safety LTE (PS-LTE), TSG Service and System Aspect (SA) WG6 (hereinafter, "SA6"), in December 2014 to work for PS-LTE that is an issue of increasing concern around the world in recent years. SA6 is undertaking the standardization work for defining the structure of applications layers of functional items of the Mission Critical Push To Talk over LTE (MCPTT) standard for public safety and for specifying functions thereof.

An MCPTT service may be broadly divided into an on-network service operating within the coverage of a network and an off-network service operating outside the coverage of the network. Requirements for the on-network service include group settings and group call settings, a one-to-many calling method, a one-to-one calling method and call control, and a group control function. A requirement for the off-network service includes a function for direct device-to-device communication

SUMMARY OF THE INVENTION

When an emergency situation occurs to a particular user during a mission using MCPTT, the user needs to report the emergency situation. However, if the emergency situation is reported using MCPTT with the same priority, stable communication may be difficult. In order to solve this problem, it is necessary to change the priority of a UE in an emergency situation. Accordingly, the present invention proposes a method for increasing the resource-acquiring priority of a UE in an emergency situation to perform stable communication and an apparatus for supporting the same.

According to one embodiment, there is provided a method for changing, by a UE, a priority in a wireless communication system. The method may include: changing a priority for D2D communication; and transmitting the changed priority to a UE in a group to which the UE belongs.

The priority may be changed by the occurrence of an emergency situation or the termination of an emergency situation.

The priority may be the priority of the group to which the UE belongs.

The priority may be the priority of the UE. The priority of the UE may indicate at least one of an application layer pre-emption level, whether the UE is allowed to pre-empty a message, an application layer priority value, and a priority assigned to the UE.

The method may further include transmitting, by the UE, data using a transmission resource pool associated with the changed priority. The data may be transmitted when there is data to be transmitted in a buffer of the UE and data with a higher priority than the changed priority is not received.

The method may further include storing, by the UE, the priority before change The changed priority may be transmitted through a PC5 message using a transmission resource pool associated with the priority before the change.

The priority may be changed to a highest priority due to the occurrence of the emergency situation.

The priority may be changed to the stored priority before the change due to the termination of the emergency situation.

The method may further include transmitting, by the UE, one-bit indication indicating the occurrence of the emergency situation or the termination of the emergency situation to the UE in the group to which the UE belongs.

The method may further include transmitting, by the UE, at least one of the ID of the group to which the UE belongs, the ID of the UE, and the priority of the UE to the UE in the group to which the UE belongs.

The changed priority may be transmitted through at least one of sidelink control information (SCI), a reserved bit in a sidelink shared channel (SL-SCH) MAC PDU subheader, a new MAC control element included in a sidelink, and an RRC message transmitted on a sidelink broadcast control channel (SBCCH).

The occurrence of the emergency situation may be at least one of the occurrence of an MCPTT emergency alert, the occurrence of an MCPTT emergency group call, and the occurrence of an MCPTT emergency individual call, and the termination of the emergency situation may be at least one of the termination of an MCPTT emergency alert, the termination of an MCPTT emergency group call, or the termination of an MCPTT emergency individual call.

According to another embodiment, there is provided a UE for changing a priority in a wireless communication system. The UE may include: a memory; a transceiver; and a processor to connect the memory and the transceiver, wherein the processor may be configured to: change a priority for D2D communication; and control the transceiver to transmit the changed priority to a UE in a group to which the UE belongs, and the priority may be changed by an occurrence of an emergency situation or a termination of an emergency situation.

A UE in an emergency situation may stably use MCPTT.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
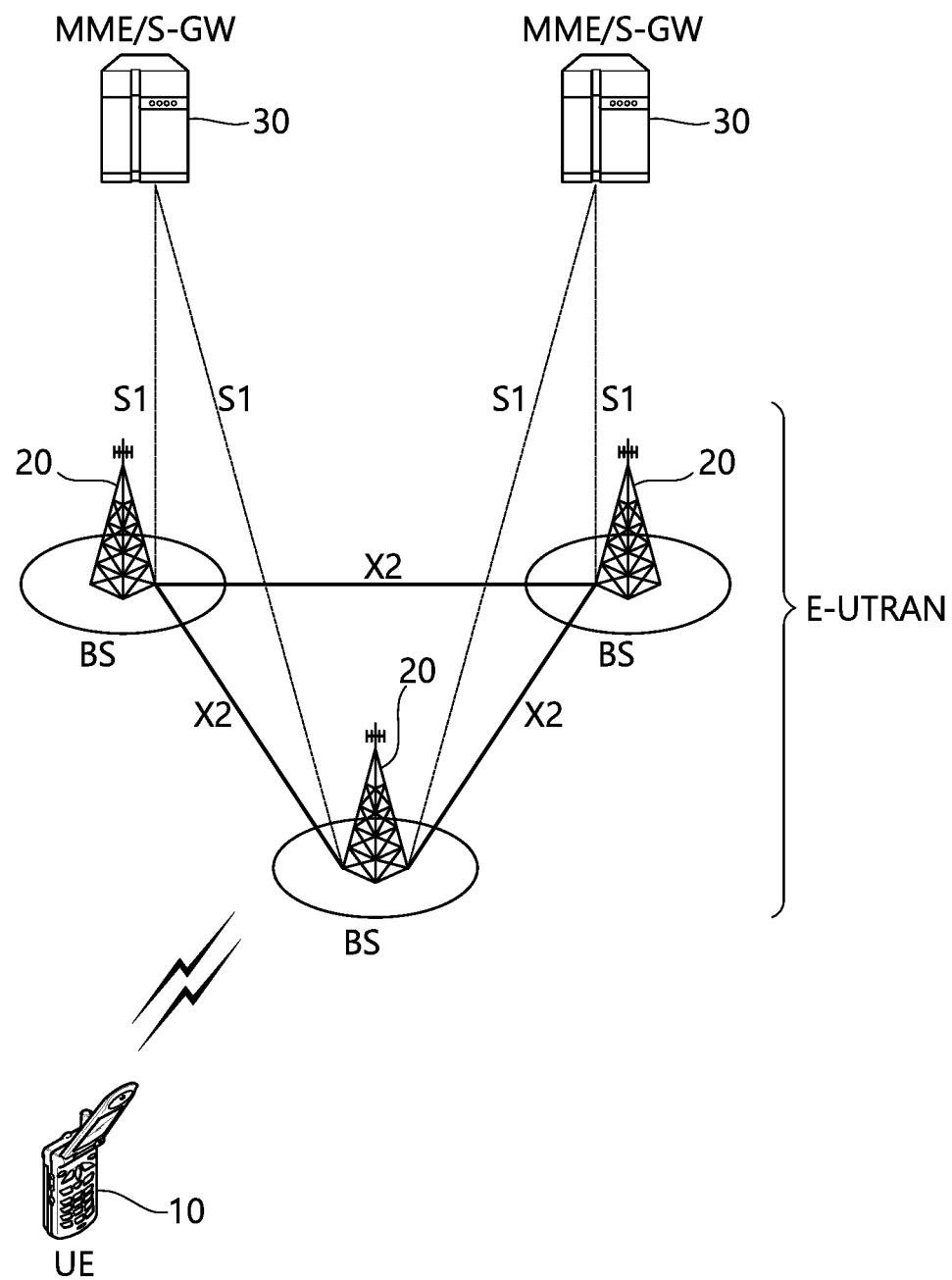
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
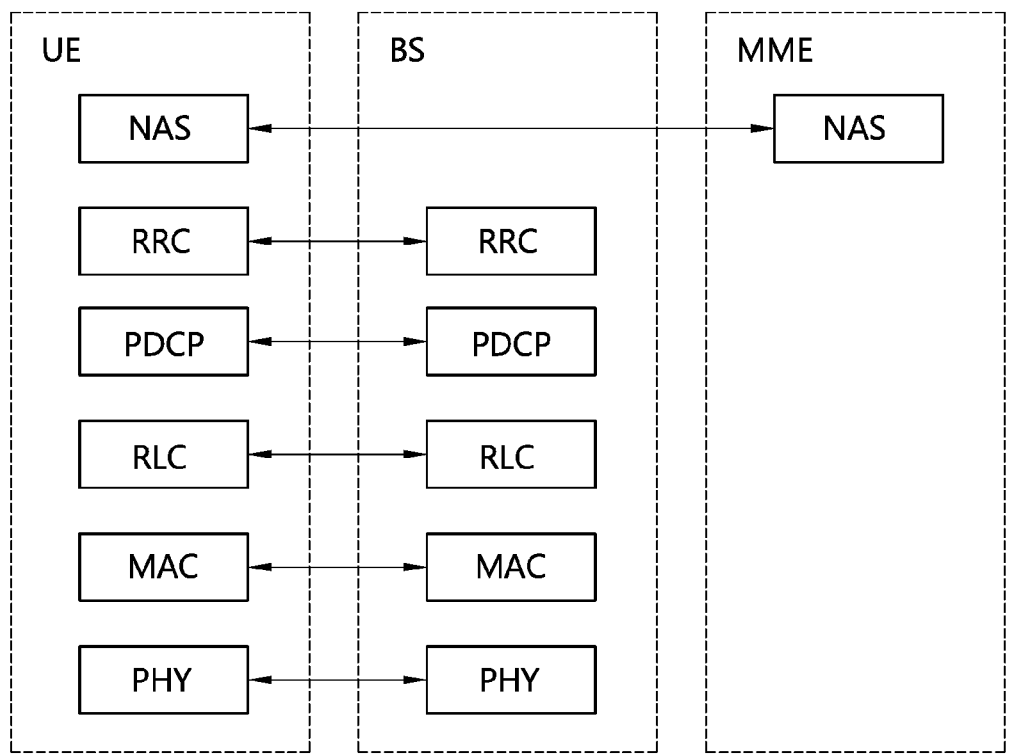
FIG. 2 shows a control plane of a radio interface protocol of an LTE system.
Figure 3:
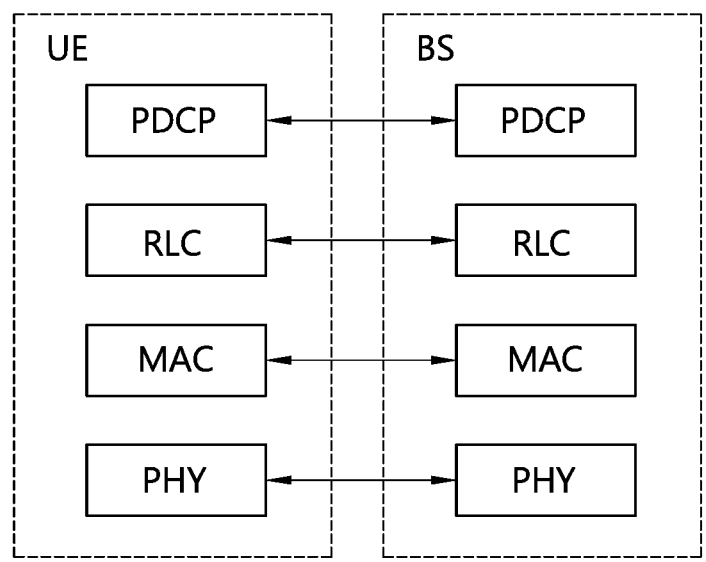
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel The PHY layer is connected to a medium access control (MAC) layer, which is a higher layer of the PHY layer, through a transport channel. A physical channel is mapped to the transport channel Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, An RRC state of a UE and RRC connection procedure are described.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Figure 4:
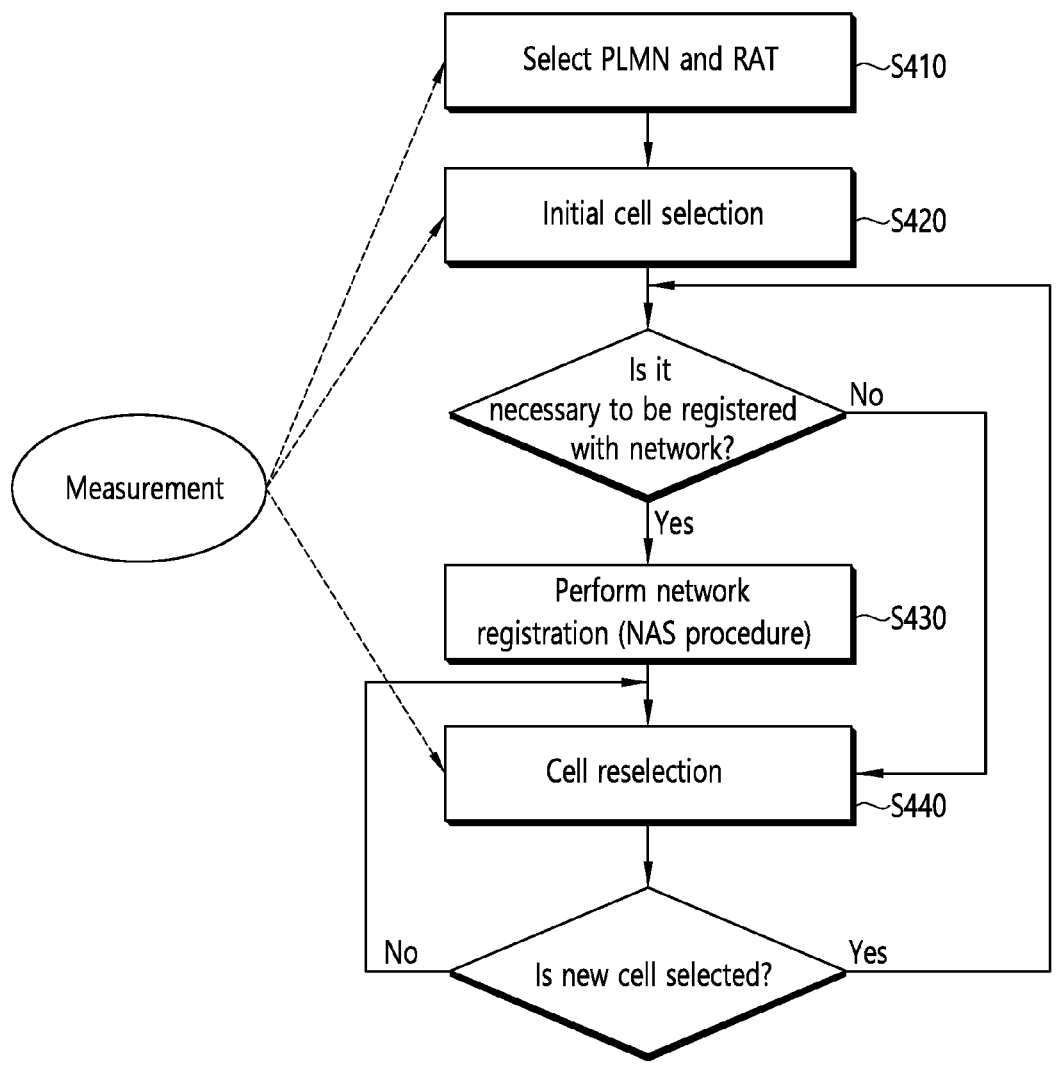
FIG. 4 shows a procedure in which UE that is initially powered on experiences a cell selection process, registers it with a network, and then performs cell reselection if necessary.

FIG. 4 shows a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
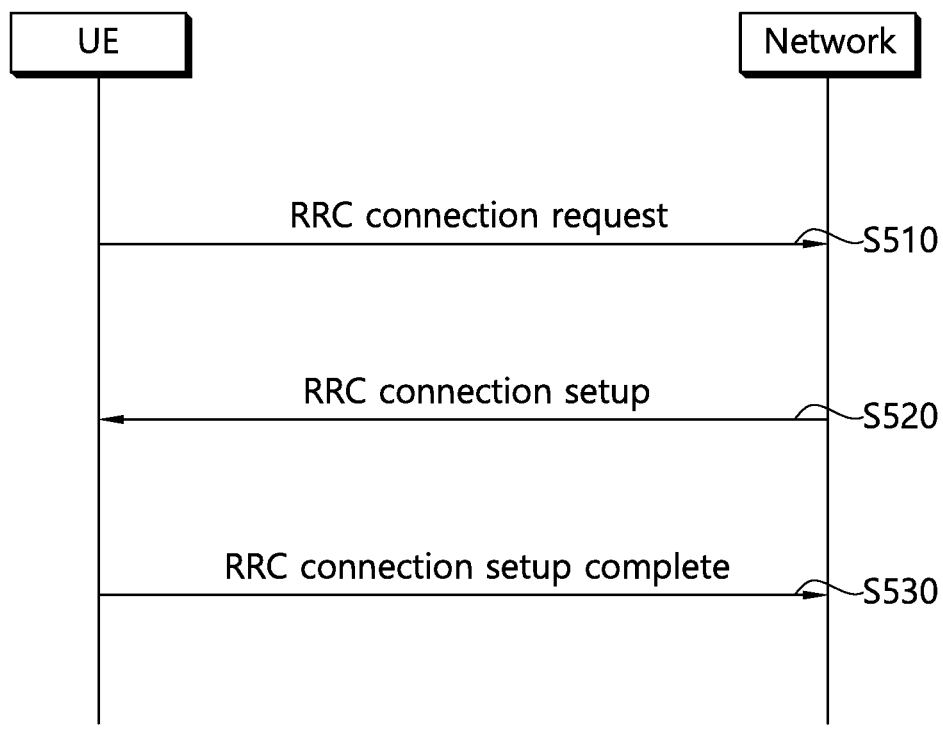
FIG. 5 shows an RRC connection establishment procedure.

FIG. 5 shows an RRC connection establishment procedure.

The UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
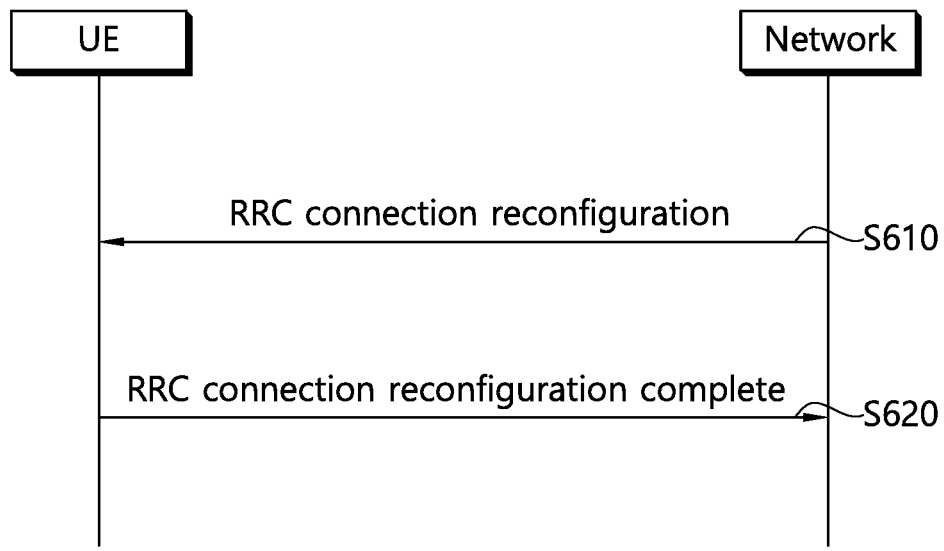
FIG. 6 shows an RRC connection reconfiguration procedure.

FIG. 6 shows an RRC connection reconfiguration procedure.

An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

The following is a detailed description of a procedure of selecting a cell by a UE.

When power is turned-on or the UE is located in a cell, the UE performs procedures for receiving a service by selecting/reselecting a suitable quality cell.

A UE in an RRC idle state should prepare to receive a service through the cell by always selecting a suitable quality cell. For example, a UE where power is turned-on just before should select the suitable quality cell to be registered in a network. If the UE in an RRC connection state enters in an RRC idle state, the UE should selects a cell for stay in the RRC idle state. In this way, a procedure of selecting a cell satisfying a certain condition by the UE in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the UE.

Hereinafter, a method and a procedure of selecting a cell by a UE in a 3GPP LTE is described.

A cell selection process is basically divided into two types.

The first is an initial cell selection process. In this process, UE does not have preliminary information about a wireless channel Accordingly, the UE searches for all wireless channels in order to find out a proper cell. The UE searches for the strongest cell in each channel Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each UE set by a network may refer to a dedicated priority. If receiving the dedicated priority, the UE may receive a valid time associated with the dedicated priority together. If receiving the dedicated priority, the UE starts a validity timer set as the received valid time together therewith. While the valid timer is operated, the UE applies the dedicated priority in the RRC idle mode. If the valid timer is expired, the UE discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$$R_S = Q_{meas,s} + Q_{hyst}, R_n = Q_{meas,n} - Q_{offset} \quad \text{[Equation 1]}$$

In this case, Rs is the ranking criterion of a serving cell, Rn is the ranking criterion of a neighbor cell, Qmeas,s is the quality value of the serving cell measured by UE, Qmeas,n is the quality value of the neighbor cell measured by UE, Qhyst is the hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell. If a reselected cell is not a suitable cell, UE excludes a corresponding frequency or a corresponding cell from the subject of cell reselection.

Figure 7:
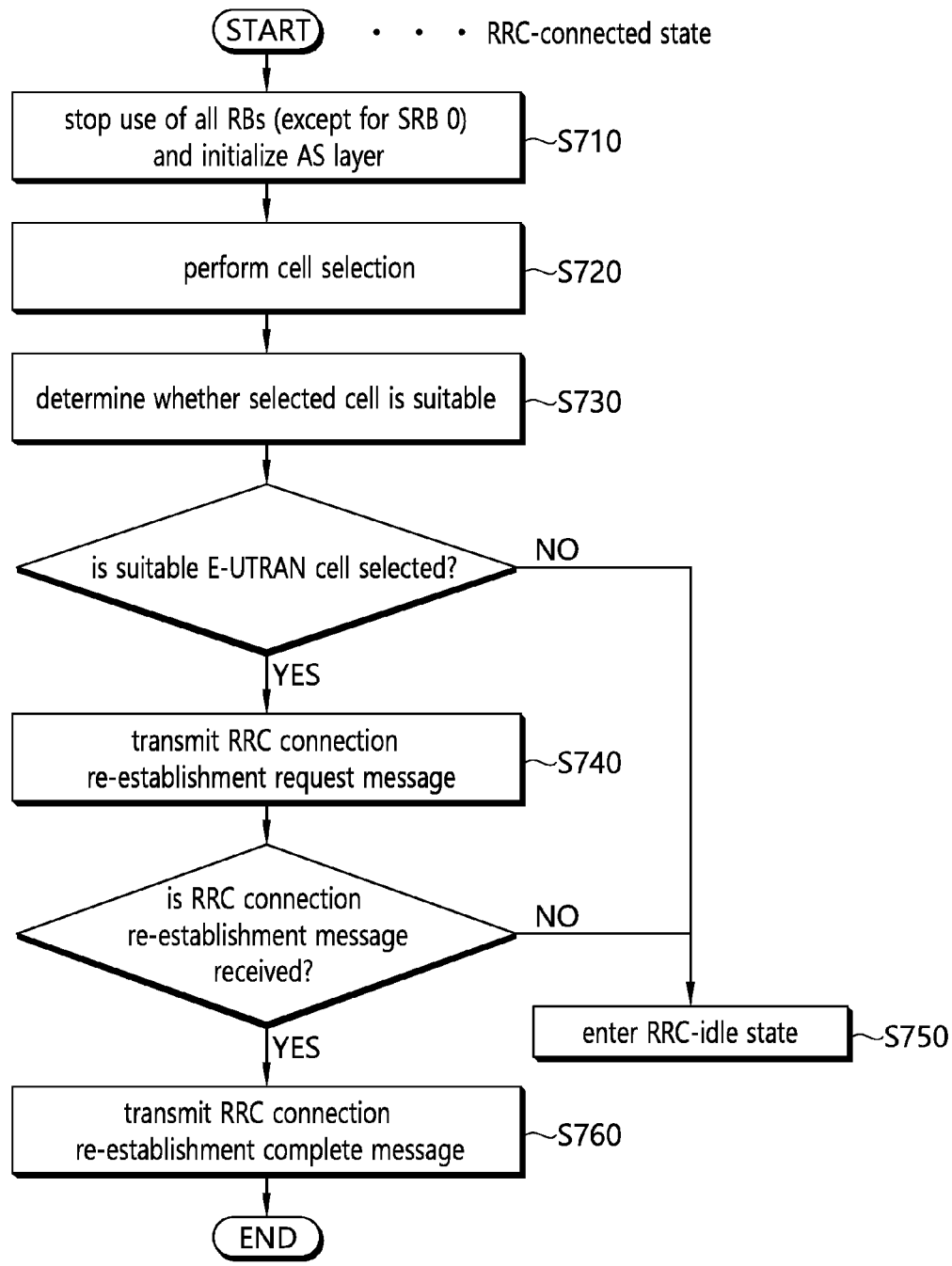
FIG. 7 shows an RRC connection re-establishment procedure.

FIG. 7 shows an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described. The ProSe includes ProSe direct communication and ProSe direct discovery.

The ProSe direct communication presents communication performed by two or more adjacent UEs. The UEs may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a UE which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable UEs are closed to each other, and reports the close state thereof the two ProSe enabled UEs. Hereinafter, the ProSe direct communication may refer to D2D communication, and the ProSe direct discovery may refer to D2D discovery.

Figure 8:
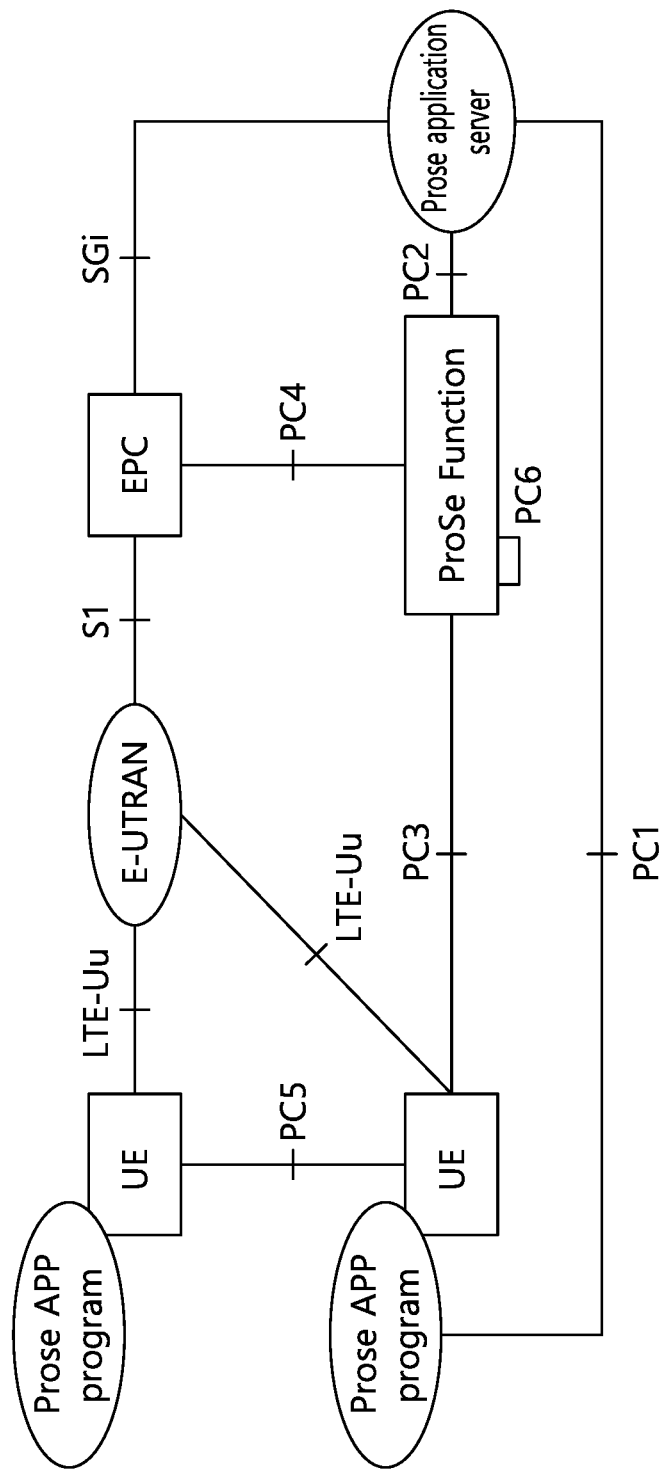
FIG. 8 shows a reference structure for a ProSe.

FIG. 8 shows a reference structure for a ProSe.

Referring to FIG. 8, the reference structure for a ProSe includes a plurality of UEs having E-UTRAN, EPC, and ProSe application program, a ProSe application (APP) server, and a ProSe function. An EPC is a representative example of the E-UTRAN. The EPC may include an MME, an S-GW, a P-GW, a policy and charging rules function (PCRF), and a home subscriber server (HSS). The ProSe application server is a user of ProSe in order to make an application function. The ProSe application server may communicate with an application program in the UE. The application program in the UE may use a ProSe ability to make an application function.

The ProSe function may include at least one of following functions but is not limited thereto.

Interworking via a reference point towards the 3rd party applications

Authorization and configuration of the UE for discovery and direct communication)

Enable the function of the EPC level ProSe discovery

ProSe related new subscriber data and handling of data storage, and also handling of ProSe identities Security related function Provide control towards the EPC for policy related function Provide function for charging (via or outside of EPC, e.g., offline charging))

Hereinafter, a reference point and a reference interface will be described in a reference structure for the ProSe.

PC1: a reference point between a ProSe application program in the UE and a ProSe application program in a ProSe application server. The PC1 is used to define signaling requirements in an application level.

PC2: is a reference point between the ProSe application server and a ProSe function. The PC2 is used to define an interaction between the ProSe application server and a ProSe function. An application data update of a ProSe database of the ProSe function may be an example of the interaction.

PC3: is a reference point between the UE and the ProSe function. The PC3 is used to define an interaction between the UE and the ProSe function. Configuration for ProSe discovery and communication may be an example of the interaction.

PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.

PC5: is a reference point to use control/user plane for discovery, communication, and relay between UEs, and 1:1 communication.

PC6: is a reference point to use a function such as ProSe discovery between users included in different PLMNs.

SGi: may be used for application data and application level control information exchange.

Hereinafter, ProSe Direct Communication (D2D Communication) is described.

The ProSe direct communication is a communication mode where two public safety UEs may perform direct communication through a PC 5 interface. The communication mode may be supported in both of a case of receiving a service in coverage of E-UTRAN or a case of separating the coverage of E-UTRAN.

Figure 9:
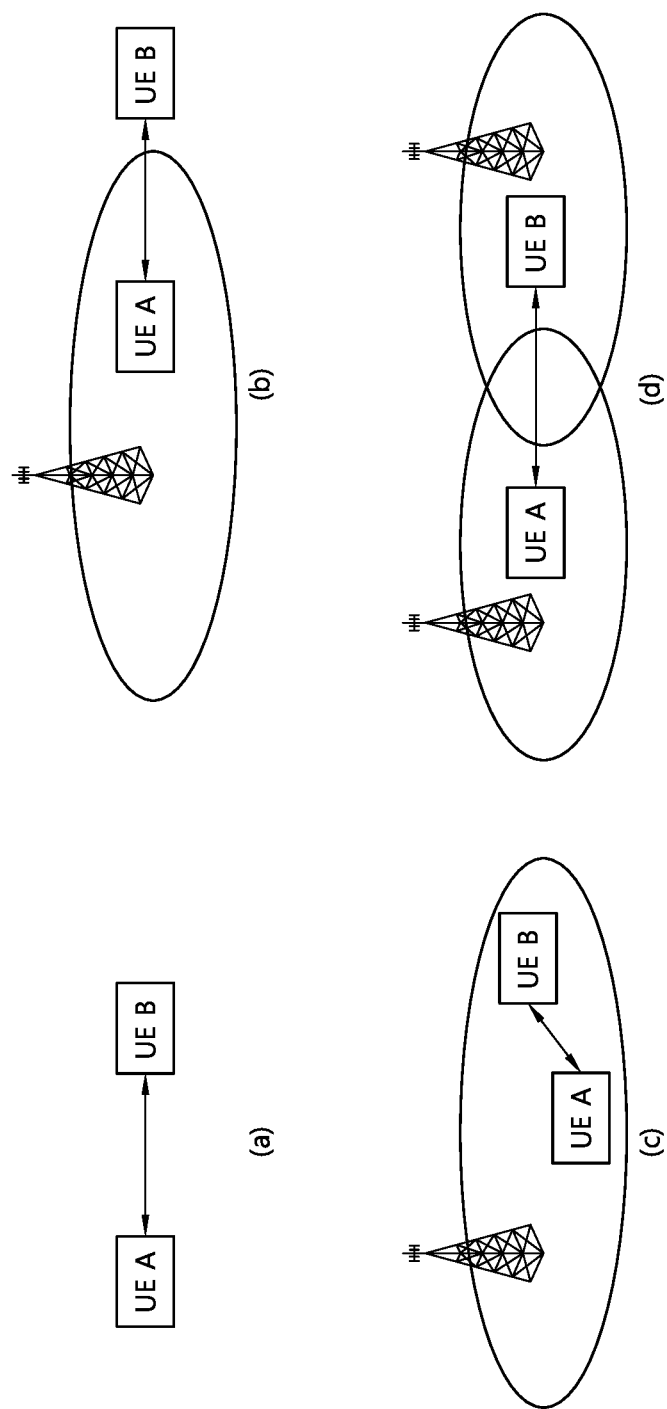
FIG. 9 shows arrangement examples of UEs performing ProSe direct communication and cell coverage.

FIG. 9 shows arrangement examples of UEs performing ProSe direct communication and cell coverage.

Referring to FIG. 9(a), UEs A and B may be located outside of the cell coverage. Referring to FIG. 9(b), the UE A may be located in the cell coverage and the UE B may be located outside of the cell coverage. Referring to FIG. 9(c), both of UEs A and B may be located in the cell coverage. Referring to FIG. 9(d), the UE A may be located in coverage of a first cell and the UE B may be in coverage of a second cell. As described above, the ProSe direct communication may be performed between UEs which are provided at various positions.

Meanwhile, following IDs may be used in the ProSe direct communication.

Source layer-2 ID: The source layer-2 ID identifies a sender of a packet in a PC 5 interface.

Purpose layer-2 ID: The purpose layer-2 ID identifies a target of a packet in a PC 5 interface.

SA L1 ID: The SA L1 ID represents an in an ID in a scheduling assignment (SA) in the PC 5 interface.

Figure 10:
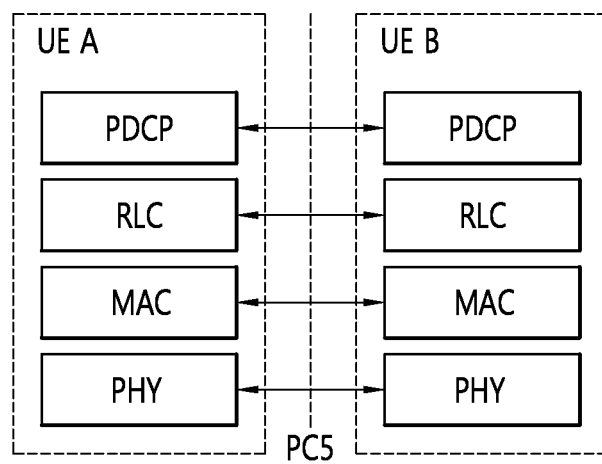
FIG. 10 shows a user plane protocol stack for the ProSe direct communication.

FIG. 10 shows a user plane protocol stack for the ProSe direct communication.

Referring to FIG. 10, the PC 5 interface includes a PDCH layer, a RLC layer, a MAC layer, and a PHY layer. There may not be HARQ feedback in the ProSe direct communication. An MAC header may include the source layer-2 ID and the purpose layer-2 ID.

Hereinafter, Radio Resource Assignment for ProSe Direct Communication is described. A ProSe enable UE may use following two modes with respect to resource assignments for the ProSe direct communication.

1) Mode 1: The mode 1 is a mode for receiving scheduling a resource for the ProSe direct communication from a base station. The UE should be in a RRC_CONNECTED state according to the mode 1 in order to transmit data. The UE requests a transmission resource to the base station, and the base station schedules a resource for scheduling assignment and data transmission. The UE may transmit a scheduling request to the base station and may transmit a Buffer Status Report (ProSe BSR). The base station has data which the UE will perform the ProSe direct communication and determines whether a resource for transmitting the data is required.

2) Mode 2: The mode 2 is a mode for selecting a direct resource. The UE directly selects a resource for the ProSe direct communication from a resource pool. The resource pool may be configured by a network or may be previously determined.

Meanwhile, when the UE includes a serving cell, that is, when the UE is in an RRC_CONNECTED state with the base station or is located in a specific cell in an RRC_IDLE state, the UE is regarded to be in coverage of the base station. If the UE is located outside of the coverage, only the mode 2 is applicable. If the UE is located in the coverage, the mode 1 or the mode 2 may be used according to setting of the base station. If there are no exceptional conditions, only when the base station is configured, the UE may change a mode from the mode 1 to the mode 2 or from the mode 2 to the mode 1.

Hereinafter, ProSe Direct Discovery (D2D Discovery) is described.

The ProSe direct discovery represents a process used to discover when the ProSe enabled UE discovers other neighboring ProSe enabled UE and refers to D2D direction discovery or D2D discovery. In this case, an E-UTRA wireless signal through the PC 4 interface may be used. Hereinafter, information used for the ProSe direct discovery refers to discovery information.

Figure 11:
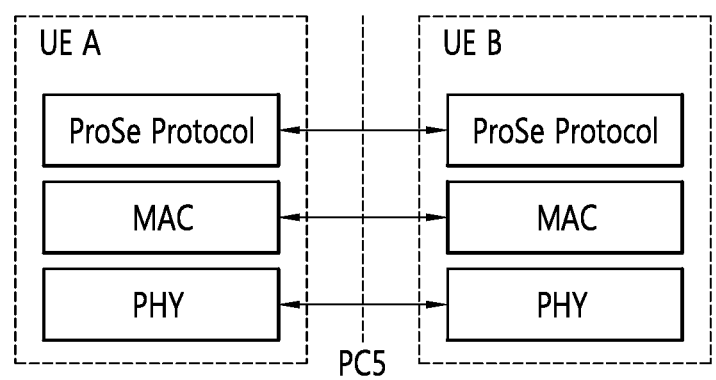
FIG. 11 shows a PC 5 interface for D2D discovery.

FIG. 11 shows a PC 5 interface for D2D discovery.

Referring to FIG. 11, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1) Type 1: The type 1 is a method assigned so that resources for announcing the discovery information are not UE-specific and the base station provides resource pool configuration for announcing the discovery information to the UEs. The configuration may be included in a system information block (SIB) to be signaled in a broadcast scheme. Alternatively, the configuration may be included in a UE specific RRC message to be provided. Alternatively, the configuration may be broadcast-signaled or UE-specific signaled of a different layer from the RRC message. The UE selects a resource from an indicated resource pool to announce discovery information using the selected resource. The UE may announce discovery information through a resource optionally selected during each discovery period.

2) Type 2: The type 2 is a method where resources for announcing the discovery information are UE-specifically assigned. A UE in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in UEs.

With respect to a UE in an RRC_IDLE state, a base station may report a type 1 resource pool for announcing the discovery signal as an SIB. UEs where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the UE should enter the RRC_CONNECTED state for announcing the discovery information.

With respect to a UE in an RRC_CONNECTED state, the base station may configure whether to use a type 1 resource pool or a type 2 resource pool for announcing the discovery information through a RRC signal.

Figure 12:
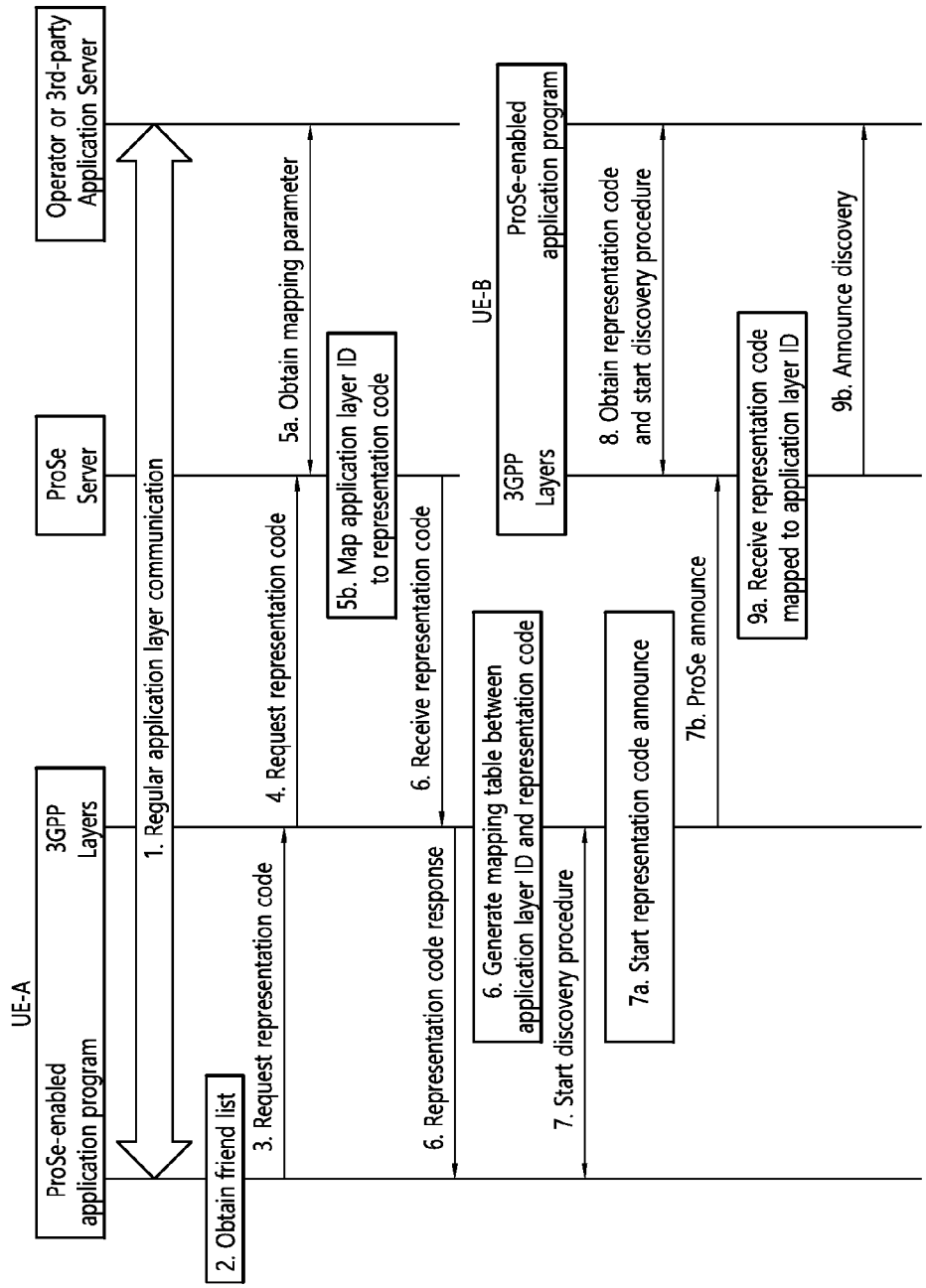
FIG. 12 shows an embodiment of a ProSe direct discovery procedure.

FIG. 12 shows an embodiment of a ProSe direct discovery procedure.

Referring to FIG. 12, it is assumed in a UE A and a UE B that a ProSe-enabled application program is operated, and the UE A and the UE B are configured in a friend relationship to each other, that is, a relationship capable of allowing D2D communication with each other in the application program. Hereinafter, the UE B may be expressed as a friend of the UE A. For example, the application program may be a social networking program. 3GPP Layers correspond to functions of an application program for using a ProSe discovery service regulated according to 3GPP.

A ProSe direct discovery between the UE A and the UE B may perform a following procedure.

1) First, the UE A performs regular application-Layer communication with an application server. The above communication is performed based on Application programming interface (API).

2) A ProSe enabled application program of the UE A receives a list of application layer IDs having a friend relationship. The application layer ID may generally be in the form of a network access ID. For example, an application layer ID of the UE A may have a form such as adam@example.com.

3) A UE A requests private expression codes for a user and private expression codes for a friend of the user.

4) 3GPP layers transmit an expression code request to a ProSe server.

5) The ProSe server map application layer IDs provided from an operator or a third application server to private expression codes. For example, an application layer ID such as adam@example.com. The mapping may be performed based on parameters (e.g., mapping algorithms, key values, and the like) received from an application service of the network.

6) The ProSe server responds the obtained expression codes to the 3GPP layers. The 3GPP layers report that expression codes with respect to the requested application layer are successively received to the ProSe enabled application program. Further, a mapping table between the application layer IDs and the expression codes are generated.

7) The ProSe enabled application program requests the 3GPP layers to start the discovery procedure. That is, when one of friends is located close to the UE A and direct communication may be performed, the ProSe enabled application program attempts the discovery. 3GPP layers announce a private expression code of the UE A (that is, "GTER543$#2FSJ67DFSF" which is a private expression code of adam@example.com in the above example). In mapping of an application layer ID of a corresponding application program and the private expression code, the mapping relationship may be known by the previously received friends, and the mapping may be performed.

8) It is assumed that the UE B is operating the same ProSe enabled application program as that of the UE A, and the above steps 3 to 6 may be executed. 3GPP layers included in the UE B may perform ProSe discovery.

9) When the UE B receives the above announce from the UE A, the UE B determines whether the private expression code included in the announce is known by the UE B or is mapped to an application layer ID. As illustrated in step 8, since the UE B performs steps 3 to 6, the UE B knows a private expression code with respect to the UE A, mapping of the private expression code to the application layer ID, and which is a corresponding application program. Accordingly, the UE B may discover the UE B from the announce of the UE A. The 3GPP layers in the UE B announces that adam@example.com is discovered to the ProSe enable application program.

FIG. 12 shows a discovery procedure by taking into consideration the UEs A and B, the ProSe server, and the application server. Only an operation side between the UEs A and B is described. The UE A transmits a signal called the announce (the procedure may refer to announcement), and the UE B receives the announce to discover the UE A. That is, a discovery procedure of FIG. 12 in an operation directly related to another UE among operations performed by each UE may refer to a single step discovery procedure may refer to a single step discovery procedure in a side of one step.

Figure 13:
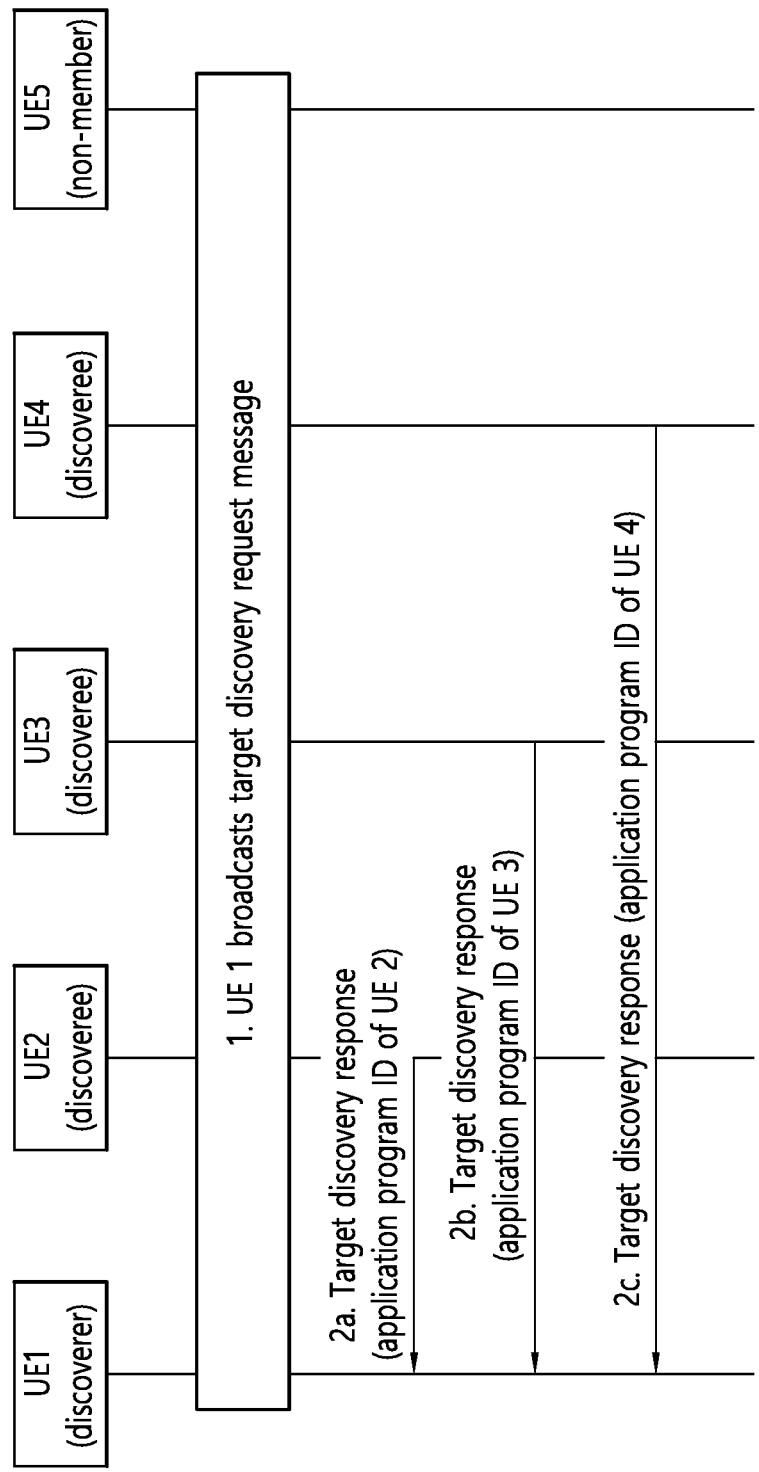
FIG. 13 shows another embodiment of a ProSe direct discovery procedure.

FIG. 13 shows another embodiment of a ProSe direct discovery procedure.

In FIG. 13, it is assumed that the UE 1 to the UE 4 may be included in a specific group communication system enablers (GCSE) group. It is assumed that the UE 1 is a discoverer and UEs 2, 3, and 4 are a discoveree. A UE 5 is a UE regardless of a discovery procedure.

The UE 1 and the UEs 2 to 4 may perform a following operation in a discovery procedure. First, the UE 1 broadcasts a targeted discovery request message (hereinafter referred to 'discovery request message' or 'M1') in order to discover whether an optional UE included in the GCSE group is located around the UE 1. The targeted discovery request message may include a unique application program group ID or a layer-2 group ID of the specific GCSE group. Further, the targeted discovery request message may include a unique ID of the UE 1, that is, an application program private ID. The targeted discovery request message may be received by the UEs.

The UE 5 transmits no response messages. The UEs 2, 3, and 4 included in the GCSE group transmit a targeted discovery response message (hereinafter referred to as a discovery response message or M2) as a response to the targeted discovery request message. The targeted discovery response message may include a unique application program private ID of a UE transmitting the message.

An operation of UEs in a ProSe discovery procedure illustrated in FIG. 13 will be described. A discoverer (UE 1) transmits the targeted discovery request message, and receives a targeted discovery response message being a response thereto. In addition, if a discoveree (e.g., UE 2) receives the targeted discovery request message, the discoveree transmits a targeted discovery response message as a response thereto. Accordingly, each UE performs an operation a second step. In the above side, a ProSe discovery procedure of FIG. 13 may refer to a discovery procedure.

In addition to the discovery procedure illustrated in FIG. 13, if the UE 1 (discoverer) transmits a discovery confirm message (hereinafter may refer to M3) as a response to the targeted discovery response message, this may refer to a third step discovery procedure.

Figure 14:
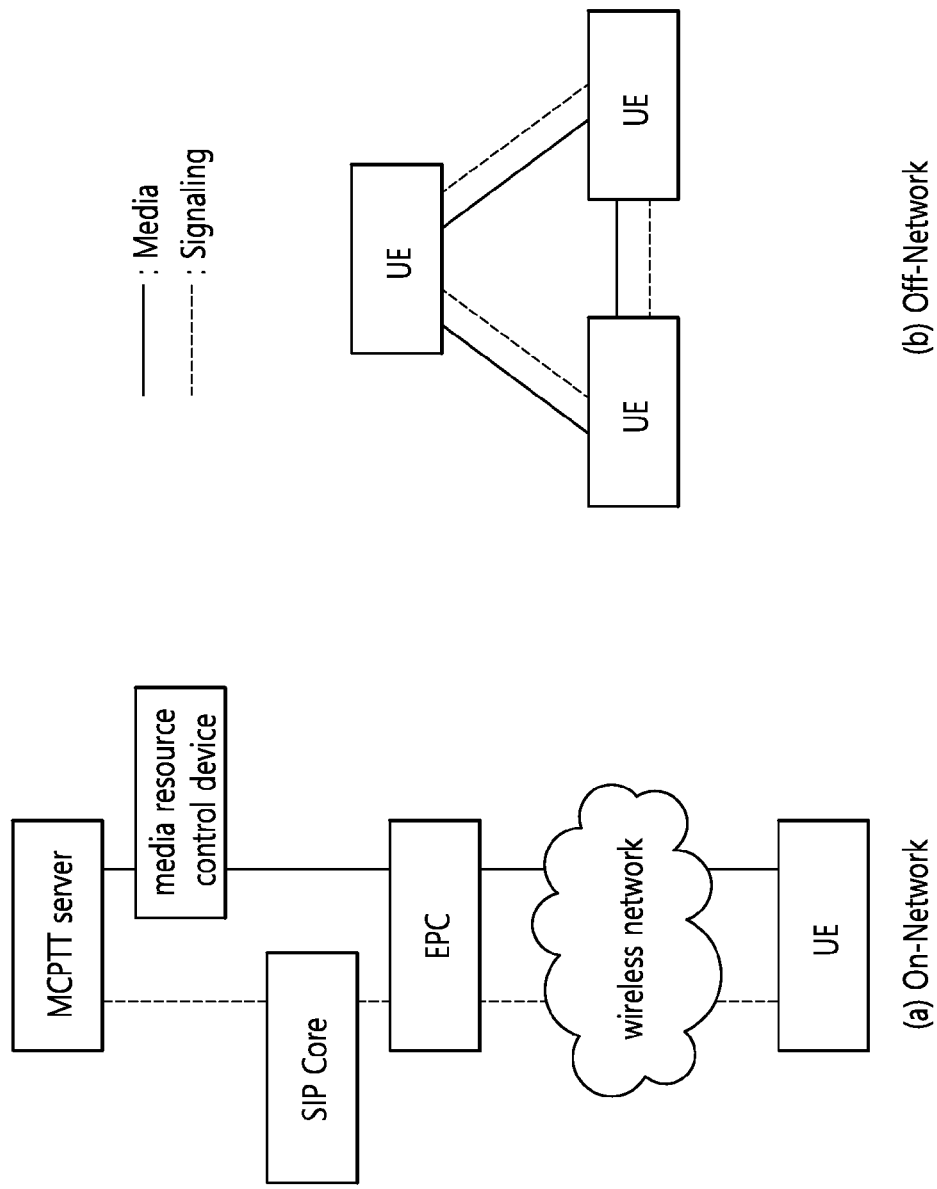
FIG. 14 shows the structure of Mission Critical Push To Talk (MCPTT) as a communication standard for public safety.

FIG. 14 shows the structure of Mission Critical Push To Talk (MCPTT) as a communication standard for public safety.

Referring to FIG. 14, MCPTT may be divided into a signaling plane for UE authentication and session establishment for group communication and a media plane for voice transmission.

On a signaling plane of on-network MCPTT, a UE is connected to an MCPTT server (MCPTT service application) via a wireless network, an EPC and an SIP core (core element for the session initiation protocol) as shown in FIG. 14(*a*). The wireless network functions to enable the UE to wirelessly connect to a communication network, and the EPC functions to enable the UE connected using the wireless network to connect to another network system. The SIP core is connected to an MCPTT service application server and provides functions for signaling routing and session management. The MCPTT server plays a key role in providing an MCPTT service to each UE and provides group management and user information control functions.

On a media plane, the UE is connected to the MCPTT server via the wireless network, the EPC, and a media resource control device, as shown in FIG. 14(*a*). The media resource control device controls an actual voice media transmission path, a voice transmission right, and codec conversion for a group call. The MCPTT server controls media transmission for MCPTT communication through the media resource control device.

As shown in FIG. 14(*b*), off-Network MCPTT allows UEs to be connected to each other on a signaling plane and on a media plane and supports direct device-to-device communication and relay functions through an application layer. Direct device-to-device communication uses proximity service (ProSe) defined in 3GPP.

In the device-to-device relay function, a relay UE operates as a server providing an MCPTT service to manage a group and to control media. A device-to-network relay function provides a service from an MCPTT server using a ProSe UE-to-network relay technique defined in 3GPP ProSe.

During a mission using MCPTT, an emergency situation (for example, death or serious injury) may occur to a particular user. Then, the user needs to report the emergency situation. It is necessary to increase the priority of acquiring resources for this type of report (for example, an MCPTT emergency alert, an MCPTT emergency group call, or an MCPTT emergency individual call). In addition, members in the same group also need to have a high priority in acquiring resources in order to handle emergency situations.

When a BS schedules resources to be used by a ProSe UE (that is, in mode 1), the BS needs to know whether a resource request is for reporting an emergency situation to a group in order to prioritize UEs in an emergency situation to quickly acquire resources and in order to assign priorities in scheduling for the group. In addition, if the UE chooses a resource pool associated with a priority, it may be advantageous to distribute information on a changed situation so that other UEs in the same group can also quickly utilize an appropriate pool.

Accordingly, the present invention proposes a method for reporting information on a changed situation by a UE in an emergency situation, and an apparatus for supporting the same. In the following embodiments of the present invention, ProSe, sidelink and D2D may be used to indicate the same concept. In the following embodiments of the present invention, mode 1 refers to a mode in which a BS schedules a transmission resource (grant) for ProSe direct communication, and mode 2 refers to a mode in which a BS provides a transmission pool and a UE autonomously selects a transmission resource in the provided pool. In the following embodiments of the present invention, it is assumed in mode 2 that each pool and each group have an associated priority so that a UE belonging to a specific group can transmit a ProSe message using a transmission resource pool associated with a group priority. For a UE in an emergency situation to distribute the emergency situation to a BS in a group or another UE in the group, the present invention may include a first step of triggering the distribution of a changed situation of the UE, a second step of reporting emergency situation information to the BS or the other UE, and a third step in which the BS schedules transmission resource grants or the UE selects a transmission resource pool. Hereinafter, each step will be described in detail.

1. Step 1: The distribution of a changed situation of the UE may be triggered. Specifically, the distribution of a changed situation of the UE may be triggered based on any one of a group/call priority change, the occurrence of an emergency situation (for example, the occurrence of an MCPTT emergency alert, the occurrence of an MCPTT emergency group call, or the occurrence of an MCPTT emergency individual call), the termination of an emergency situation (for example, the termination of an MCPTT emergency alert, the termination of an MCPTT emergency group call, or the termination of an MCPTT emergency individual call), and a user priority change. The user priority may indicate at least one of an application layer pre-emption level (a high-level value indicating that a message/traffic/application of a corresponding user is not pre-empted over PC5 by an application of a low-level value), whether the user is allowed to pre-empty a message, an application layer priority value, and a priority assigned to the user (for example, according to the ranking). The changed priority may be transmitted per data packet in an upper layer (PPPP; ProSe Per Packet Priority). The distribution of the changed situation may be triggered in an upper layer including an NAS layer. Alternatively, when an AS layer stores priority information on a user/group/call and an upper layer newly receives priority information different from the stored priority information, it is possible to trigger the distribution of a changed situation of the user.

2. Step 2: When a trigger condition is satisfied in the first step, the UE in mode 1 may transmit emergency situation information to the BS (first method). Alternatively, when a trigger condition is satisfied in the first step, the UE in mode 1 or in mode 2 may transmit emergency situation information to another UE (second method). Hereinafter, the first method and the second method will be described in detail.

(1) First method: When a trigger condition is satisfied in the first step, the UE in mode 1 may transmit emergency situation information to the BS.

The emergency situation information may be transmitted through at least one of a buffer state report (BSR) relating to the group, a scheduling request, a reserved bit in an MAC PDU (sub)header, a message/signaling used for random access for RRC connection establishment (for example, a dedicated preamble, an RRC connection request message, an RRC connection establishment complete message, or a logical channel ID), and any uplink RRC message including sidelink UE information. The message used for random access for RRC connection establishment may be transmitted when RRC connection establishment is needed for the UE to transmit the emergency situation information. A new BSR format may be defined to indicate whether the emergency situation information is included.

(2) Second method: When a trigger condition is satisfied in the first step, the UE in mode 1 or in mode 2 may transmit emergency situation information to another UE.

The emergency situation information may be transmitted via a PC5 message/signaling. For example, the emergency situation information may be transmitted via any one of sidelink control information (SCI), a reserved bit in a sidelink shared channel (SL-SCH) MAC PDU (sub)header, a new MAC control element included in a sidelink, and an RRC message transmitted on a sidelink broadcast control channel (SBCCH).

The emergency situation information may include at least one of a one-bit indication indicating whether the emergency situation occurs or the emergency situation is terminated, information on a changed group priority (based on the assumption that each group has an associated priority), the ID of a group having a changed group priority, the ID of the UE, and the priority of the UE/user.

3. Step 3: When the UE is in mode 1, the network may schedule a transmission resource grant corresponding to the UE and a UE in the same group.

When the UE is in mode 2, the UE may transmit the emergency situation information to an upper layer after receiving the emergency situation information. The UE and a UE in the group to which the UE belongs may select a transmission resource pool associated with the changed priority. Alternatively, when the UE has a group priority, only the UE that has triggered the emergency situation can only select the transmission resource pool associated with the emergency situation despite the group priority.

In addition, when the UE has data to transmit in a buffer (of an application layer or L2 layer) and the UE has a higher user priority than a user priority received from another UE, the UE can be allowed to perform transmission. That is, when the buffer stores data to be transmitted through PC5, the UE may check whether data having a higher user priority than the user priority of the UE is received through PC5. When there is no received data with a higher user priority, the UE may select a transmission resource pool and may transmit data using the selected transmission resource pool. The data may include sidelink control information and/or relevant data. When the foregoing conditions for transmission are not satisfied, the UE may suspend data transmission through PC5. A period in which data transmission through PC5 is suspended may be a set time interval/fixed time interval.

According to the embodiments of the present invention, a UE in an emergency situation may have a high priority in acquiring resources using information on a changed situation, thereby performing stable communication.

Figure 15:
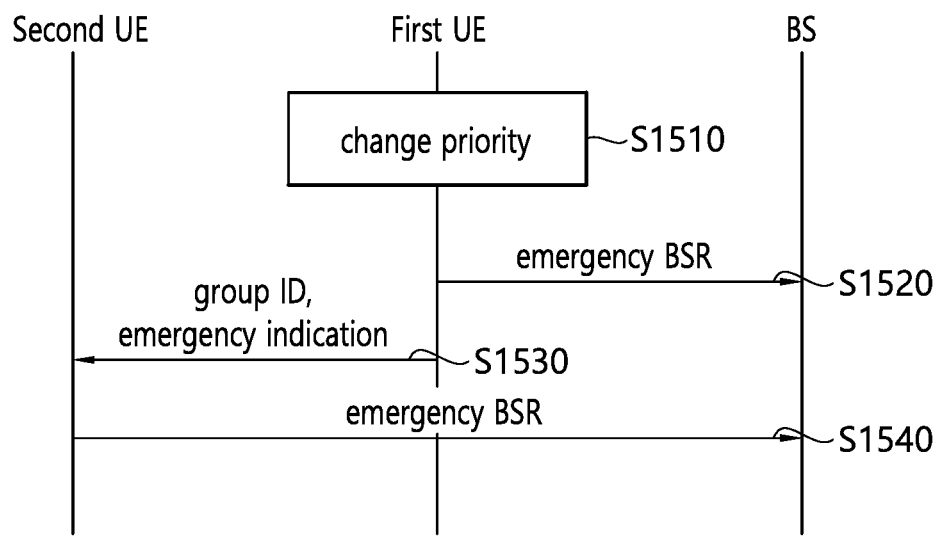
FIG. 15 shows a method in which a UE in mode 1 changes a priority according to one embodiment of the present invention.

FIG. 15 shows a method in which a UE in mode 1 changes a priority according to one embodiment of the present invention.

Referring to FIG. 15, the UE may change a group priority due to the occurrence of an emergency situation (S1510). That is, when an emergency situation occurs to a first UE, the first UE may raise the priority of the first UE.

In order to report the emergency situation to a UE in a group including the first UE, the first UE may transmit a BSR for requesting a transmission resource to a BS (S1520). The UE may indicate whether an emergency situation has occurred through a BSR. Specific methods for indicating the occurrence of an emergency situation are illustrated as follows.

(1) Option 1: An MAC CE BSR may contain one bit that indicates the highest priority for a particular group index or a particular LCG ID. To this end, a new SL BSR MAC CE may be defined, and a new LCID value may be used. The new SL BSR MAC CE may include only a group with a priority changed to the highest priority. The new SL BSR MAC CE may have a higher priority than that of a current SL BSR MAC CE in a logical channel priority procedure.

(2) Option 2: A specific group index or a specific LCG ID may be reserved for the highest priority. Therefore, when the UE changes the priority of the group, the UE may autonomously change the index of the group to which the UE belongs to the index of a reserved group having the highest priority.

(3) Option 3: The UE may transmit an RRC message indicating that a specific group has been changed to be on the highest priority. Thus, the BS may assign a priority to the group for scheduling.

The UE may assign a priority to the group using a resource allocated by the BS and may transmit an emergency indication to the group (S1530). That is, the first UE may transmit the emergency indication to a second UE belonging to the group including the first UE.

After the emergency instruction is received, when any data is transmitted to other UEs in the group, the other UEs in the group may also transmit a BSR to report the occurrence of an emergency situation (S1540). That is, when any data is transmitted to the second UE, the second UE may transmit a BSR for requesting transmission resources to the BS. Thus, the BS can quickly schedule the UEs in the group.

Figure 16:
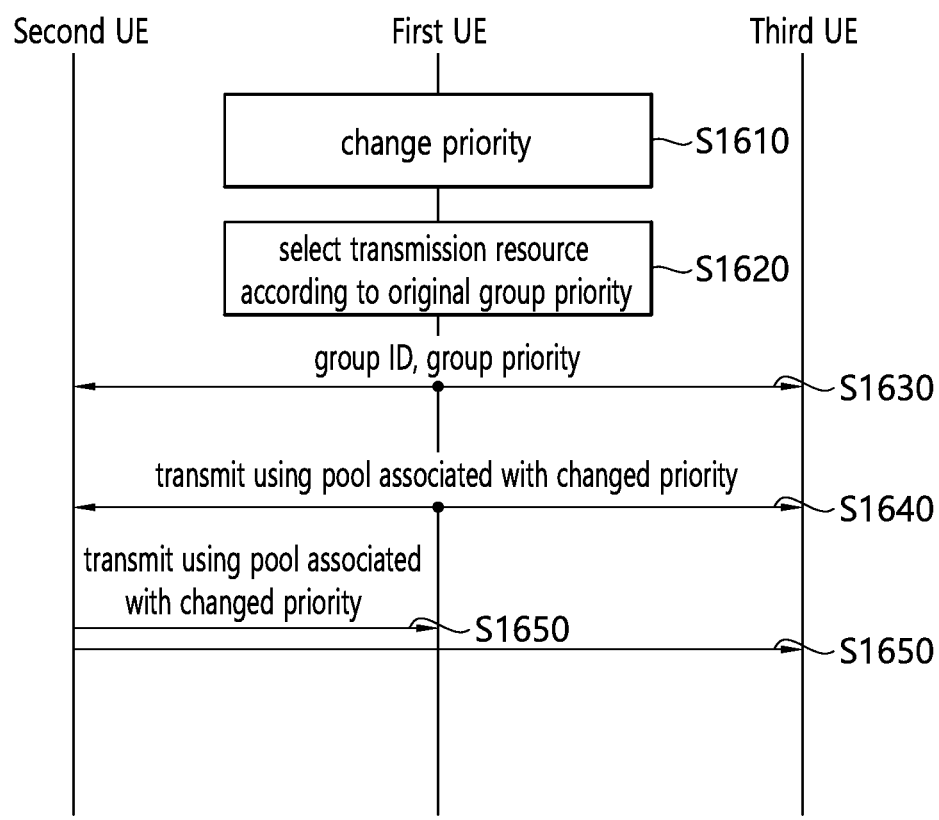
FIG. 16 shows a method in which a UE in mode 2 changes a priority according to one embodiment of the present invention.

FIG. 16 shows a method in which a UE in mode 2 changes a priority according to one embodiment of the present invention.

Referring to FIG. 16, the UE may change a group priority due to the occurrence of an emergency situation (S1610). Then, the UE may store the group priority before the change. That is, when an emergency situation occurs to a first UE, the first UE may raise the priority of the first UE and may store the original priority before raising the priority.

The UE may select a transmission resource pool associated with the group priority before the change (that is, the stored priority or the original group priority) (S1620). That is, the first UE may select a transmission resource pool associated with the group priority before the change.

The UE may distribute the changed group priority to the group to which the UE belongs through sidelink control information (S1630). Alternatively, the UE may transmit a bit indicating that the particular group has been changed to be on the highest priority via an SL-SCH MAC PDU (sub)header. Through the above process, a second UE and a third UE belonging to the group including the first UE may receive the changed priority.

After transmitting the changed priority, the UE may select a transmission resource pool associated with the changed group priority and may transmit data (S1640). The data may include sidelink control information and relevant data. That is, the first UE may perform communication with the second UE and the third UE using the transmission resource pool associated with the changed group priority.

The UE receiving the changed priority may select a transmission resource pool associated with the changed group priority and may transmit data (S1650). That is, the second UE may perform communication with the first UE and the third UE using the transmission resource pool associated with the changed group priority.

Alternatively, after the UE transmits the SL-SCH MAC PDU (sub)header indicating that the particular group has been changed to be on the highest priority, the UE in the group may select a transmission resource pool associated with the highest priority.

If the emergency situation is terminated, the UE may change the priority of the group to the group priority before the change (that is, the stored priority) so that the UE in the group uses a pool associated with the original priority, and may distribute the original group priority to other members in the group.

Figure 17:
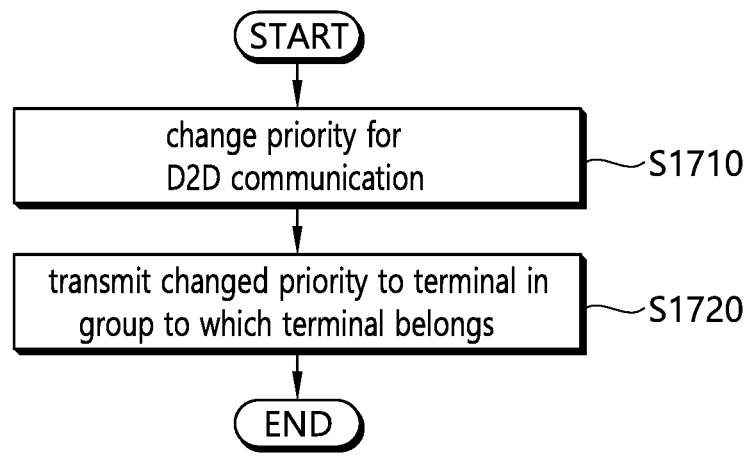
FIG. 17 is a block diagram illustrating a method in which a UE changes a priority according to one embodiment of the present invention.

FIG. 17 is a block diagram illustrating a method in which a UE changes a priority according to one embodiment of the present invention.

Referring to FIG. 17, the UE may change a priority for D2D communication (S1710).

The priority may be changed by the occurrence of an emergency situation or the termination of an emergency situation. The occurrence of the emergency situation may be at least one of the occurrence of an MCPTT emergency alert, the occurrence of an MCPTT emergency group call, and the occurrence of an MCPTT emergency individual call. The termination of the emergency situation may be at least one of the termination of an MCPTT emergency alert, the termination of an MCPTT emergency group call, or the termination of an MCPTT emergency individual call.

The priority may be the priority of a group to which the UE belongs. Alternatively, the priority may be the priority of the UE. The priority of the UE may indicate at least one of an application layer pre-emption level, whether the UE is allowed to pre-empt a message, an application layer priority value, and a priority assigned to the UE.

The UE may store the priority before the change. The occurrence of the emergency situation may change the priority to the highest priority. The termination of the emergency situation may change the highest priority to the stored priority before the change.

The UE may transmit the changed priority to a UE in the group to which the UE belongs (S1720). The changed priority may be transmitted through a PC5 message using a transmission resource pool associated with the priority before the change. The changed priority may be transmitted through at least one of sidelink control information, a reserved bit in an SL-SCH MAC PDU subheader, a new MAC control element included in a sidelink, and an RRC message transmitted on an SBCCH.

The UE may transmit one-bit indication indicating the occurrence of the emergency situation or the termination of the emergency situation to the UE in the group to which the UE belongs. The UE may transmit at least one of the ID of the group to which the UE belongs, the ID of the UE, and the priority of the UE to the UE in the group to which the UE belongs.

The UE may transmit data using a transmission resource pool associated with the changed priority. The data may be transmitted when there is data to be transmitted in a buffer of the UE and data with a higher priority than the changed priority is not received.

Figure 18:
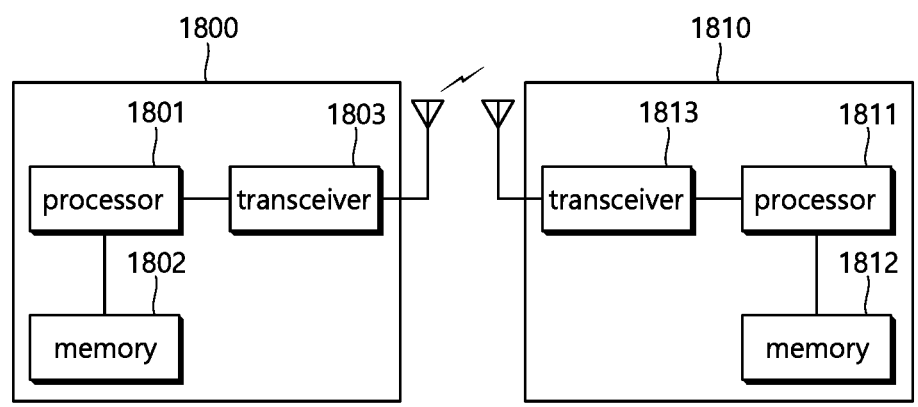
FIG. 18 is a block diagram illustrating a wireless communication system according to the embodiment of the present invention.

FIG. 18 is a block diagram illustrating a wireless communication system according to the embodiment of the present invention.

A BS 1800 includes a processor 1801, a memory 1802 and a transceiver 1803. The memory 1802 is connected to the processor 1801, and stores various information for driving the processor 1801. The transceiver 1803 is connected to the processor 1801, and transmits and/or receives radio signals. The processor 1801 implements proposed functions, processes and/or methods. In the above embodiment, an operation of the base station may be implemented by the processor 1801.

A UE 1810 includes a processor 1811, a memory 1812 and a transceiver 1813. The memory 1812 is connected to the processor 1811, and stores various information for driving the processor 1811. The transceiver 1813 is connected to the processor 1811, and transmits and/or receives radio signals. The processor 1811 implements proposed functions, processes and/or methods. In the above embodiment, an operation of the UE may be implemented by the processor 1811.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for changing, by a user equipment (UE), a priority in a wireless communication system, the method comprising:
   changing the priority of a group for sidelink communication from a first priority to a second priority, wherein the UE belongs to the group;
   after changing the priority of the group for sidelink communication from the first priority to the second priority, selecting a first transmission resource pool related to the first priority;
   transmitting information regarding the second priority to at least one UE in the group, using the selected first transmission resource pool related to the first priority;
   after the information regarding the second priority is transmitted, selecting a second transmission resource pool related to the second priority; and
   transmitting data to the at least one UE in the group, using the selected second transmission resource pool related to the second priority.

2. The method of claim 1, wherein the priority is changed from the first priority to the second priority when an emergency situation or a termination of an emergency situation occurs.

3. The method of claim 2, wherein the priority is changed from the first priority to the second priority when the emergency situation occurs, and
   wherein the second priority is higher than the first priority.

4. The method of claim 2, wherein the priority is changed from the first priority to the second priority due to a termination of an emergency situation, and
   wherein the first priority is higher than the second priority.

5. The method of claim 2, further comprising:
   transmitting, to the at least one UE in the group, information that informs the at least one UE about the occurrence of the emergency situation or the termination of the emergency situation.

6. The method of claim 2, wherein the emergency situation includes at least one of an MCPTT emergency alert, an MCPTT emergency group call, or an MCPTT emergency private call, and
   wherein the termination of the emergency situation includes at least one of a termination of an MCPTT emergency alert, a termination of an MCPTT emergency group call, or a termination of an MCPTT emergency private call.

7. The method of claim 1, wherein the priority is changed from the first priority to the second priority by changing a priority of the UE.

8. The method of claim 7, wherein the priority of the UE informs at least one of an application layer pre-emption level, whether the UE is allowed to pre-empty a message, an application layer priority value, or a priority assigned to the UE.

9. The method of claim 1, wherein when the UE has the data to be transmitted in a buffer, and when user data with a higher priority than the second priority is not received, the data is transmitted.

10. The method of claim 1, further comprising:
    storing the first priority.

11. The method of claim 1, wherein the second priority is transmitted via a PC5 message.

12. The method of claim 1, further comprising:
    transmitting, to the at least one UE in the group, at least one of an ID of the group, an ID of the UE, or a priority of the UE.

13. A user equipment (UE) for changing a priority, the UE comprising:
    at least one transceiver;
    at least one processor; and
    at least one computer memory, operably connectable to the at least one processor, and storing instructions that, when executed, cause the at least one processor to perform operations comprising:
      changing the priority of a group for sidelink communication from a first priority to a second priority, wherein the UE belongs to the group;
      after changing the priority of the group for sidelink communication from the first priority to the second priority, selecting a first transmission resource pool related to the first priority;
      transmitting the second priority to at least one UE in the group, using the selected first transmission resource pool related to the first priority;
      after the second priority is transmitted, selecting a second transmission resource pool related to the second priority; and
      transmitting data to the at least one UE in the group, using the selected second transmission resource pool related to the second priority.

* * * * *